(12) United States Patent
Chaney et al.

(10) Patent No.: US 9,740,774 B2
(45) Date of Patent: Aug. 22, 2017

(54) SYSTEM AND METHOD OF ORGANIZING AND EDITING METADATA

(75) Inventors: Jeremy P Chaney, Seattle, WA (US); Joshua E. Elman, Bellevue, WA (US); Elizabeth C Grigg, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 13/092,094

(22) Filed: Apr. 21, 2011

(65) Prior Publication Data

US 2011/0218983 A1 Sep. 8, 2011

Related U.S. Application Data

(62) Division of application No. 09/575,403, filed on May 22, 2000, now abandoned.

(51) Int. Cl.
*G06F 17/30* (2006.01)

(52) U.S. Cl.
CPC .............................. *G06F 17/30752* (2013.01)

(58) Field of Classification Search
USPC ........................................ 707/802, 804, 822
See application file for complete search history.

(56) References Cited

U.S. PATENT DOCUMENTS

| | | | |
|---|---|---|---|
| 5,959,627 A * | 9/1999 | Duwaer et al. | 715/797 |
| 6,760,721 B1 * | 7/2004 | Chasen et al. | 707/999.003 |
| 6,883,140 B1 * | 4/2005 | Acker et al. | 715/730 |

* cited by examiner

*Primary Examiner* — Khanh Pham
(74) *Attorney, Agent, or Firm* — Schwabe, Williamson & Wyatt, P.C.

(57) ABSTRACT

In the metadata organization system a metadata classification module dynamically reads metadata organization information, such as, for example, metadata field information, metadata display set information, and metadata category grouping information, from the metadata organization database, reads metadata from a metadata database, and organizes the metadata for display to a user in a graphical user interface. In the graphical user interface, a user may add, delete, and/or modify the metadata in the display. As the user changes the metadata, the metadata database is updated and the user's changes are reflected in the graphical user interface.

8 Claims, 10 Drawing Sheets

Edit Track Info (Alison)

Pop/Rock
Classical
Music Enthusiast
Jazz Set
Photos/Art
Track Contents
Entire Property Set ☐ Browse
☒ Export
✂ Clear Property
♫ Preview

Enter Basic Information Here
Track Name: Alison
Artist Name: Everything But The Girl
Track Genre: Rock
Album Name: Acoustic

Enter Track Information Here
CD Track #: 04
Preference: Very Good
Situation: Dinner
Mood: Mellow
Tempo: Moderate
Year: 0
Lyrics:
Comments:

Enter Album Information Here
Cover Art: [realjukebox]

☐ Apply Changes to all tracks in Album

[OK]  [Cancel]

FIG. 1B

SYSTEM AND METHOD OF ORGANIZING AND EDITING METADATA

CROSS-REFERENCE TO RELATED APPLICATION

The present application is a divisional application of U.S. patent application Ser. No. 09/575,403, "SYSTEM AND METHOD OF ORGANIZING AND EDITING METADATA," naming Jeremy P. Chaney, Joshua E. Elman, and Elizabeth C. Grigg as the inventor(s), filed May 22, 2000, pending; the present application claims the benefits of priority under 35 USC §119 and/or USC §120 to the above-listed application, the entirety of which is hereby incorporated by reference.

FIELD OF THE INVENTION

The system and method of the present invention relate generally to the field of managing, organizing, and editing metadata.

BACKGROUND

The increased reliance on content in digital data form has led to a need for detailed information about the content in digital data as well as techniques for managing and controlling this detailed information. This detailed information is often referred to as "metadata" and is also a form of digital data. For example, there is a high demand for audio data, and accordingly, there is a high demand for metadata about the audio data such as, for example, the artist or speaker name, album name, genre, and number of songs.

While access to metadata provides the public with a vast amount of information, it is often difficult to manage the metadata. For example, keeping track of various audio files as well as the immense amount of metadata for each audio file can be a cumbersome task.

Additionally, conventional approaches fail to account for different types of metadata for different types of data. For example, the metadata associated with video files may include similar fields as those in audio files, such as for example, the file length and file name; however, the metadata associated with video files may also include fields different from those of audio files, such as, for example, image format and main characters. In addition, one type of data may be associated with a variety of different types of metadata. For example, the metadata associated with an audio file from the classical genre may include both similar and different fields from an audio file from the R&B genre. The audio file from the classical genre may include standard fields, such as, for example, song title, song length, and album name, and may also include additional fields, such as, for example, conductor name, and orchestra name that would not be used for audio files from the R&B genre.

Conventional approaches also fail to adequately manage the unlimited amount of metadata that may be related to a data file. For example, one user may have one hundred fields of metadata for his audio files and may want to add an additional five custom fields in which he provides additional information about the audio files. Another user may have seven fields of metadata for his audio files including one custom field of metadata.

Further, conventional approaches do not allow the user to easily view, access, and edit the varying types of metadata for various types of data. It is difficult to provide a variety of users with the ability to manage their own sets of metadata that may include the standard metadata fields as well as an unlimited number of custom metadata fields.

SUMMARY OF THE INVENTION

In general, the present invention relates to managing, organizing, and displaying metadata.

One aspect of the present invention relates to a method for organizing and grouping metadata for display. The method comprises selecting a set of fields of metadata; selecting a property set; designated at least a portion of the set of fields as related to the property set to create a set of property set fields; selecting a first display set; designating at least a portion of the set of property set fields as related to the first display set to create a set of first display set fields; selecting a second display set; and designating at least a portion of the set of property set fields as related to the second display set to create a set of second display set fields.

Another aspect of the present invention relates to a method for organizing metadata. The method comprises creating a property set; selecting a set of metadata fields related to the property set wherein the metadata fields correspond to a data type; creating a set of display groupings; and grouping the selected set of metadata fields into at least one of the display groupings to form metadata field groupings.

Another aspect of the present invention relates to a method for dynamically displaying a set of metadata field data having specific display relationships on a plurality of platforms. The method comprises receiving a property set wherein the property sets includes a set of display groupings and a set of metadata fields wherein the metadata fields are related to at least one of the display groupings; generating a display structure with display grouping structures based at least on the set of display groupings; populating the display groupings with metadata field structures wherein the metadata field structures are related to at least one of the metadata fields; receiving a set of metadata field data related to the set of metadata fields; populating the metadata field structures with the related metadata field data; and displaying the display structure.

Another aspect of the present invention relates to a method for allowing a user to edit metadata using a graphical user interface display on a plurality of platforms. The method comprises querying a metadata database for a set of metadata data; dynamically displaying the set of metadata data in a display window in a graphical user interface wherein the set of metadata data is organized into category sets and display window groups; receiving a request from a user to alter the displayed metadata data; processing the request to alter the displayed metadata data; and updating the display of the metadata data in the display window.

Another aspect of the present invention relates to a metadata editor system for organizing, displaying, and allowing access to metadata from a metadata database on a plurality of platforms. The metadata editor system comprises a metadata database configured to store metadata; a metadata organization database configured to store category and property information about the metadata that signifies relationships with the metadata; and a graphical user interface display module configured to display subsets of the metadata wherein the subsets of metadata are organized by display groups.

Another aspect of the present invention relates to a metadata editor system for organizing, displaying, and allowing access to metadata from a metadata database on a plurality of platforms. The metadata editor system comprises means for storing metadata; means for storing metadata organization data wherein the metadata organization data includes groupings that define subsets of metadata as well as display sets; and means for displaying subsets of metadata wherein the subsets of metadata are organized by display sets.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 1b illustrates an example display from the RealJukebox® program.

DETAILED DESCRIPTION

Figure 1A:
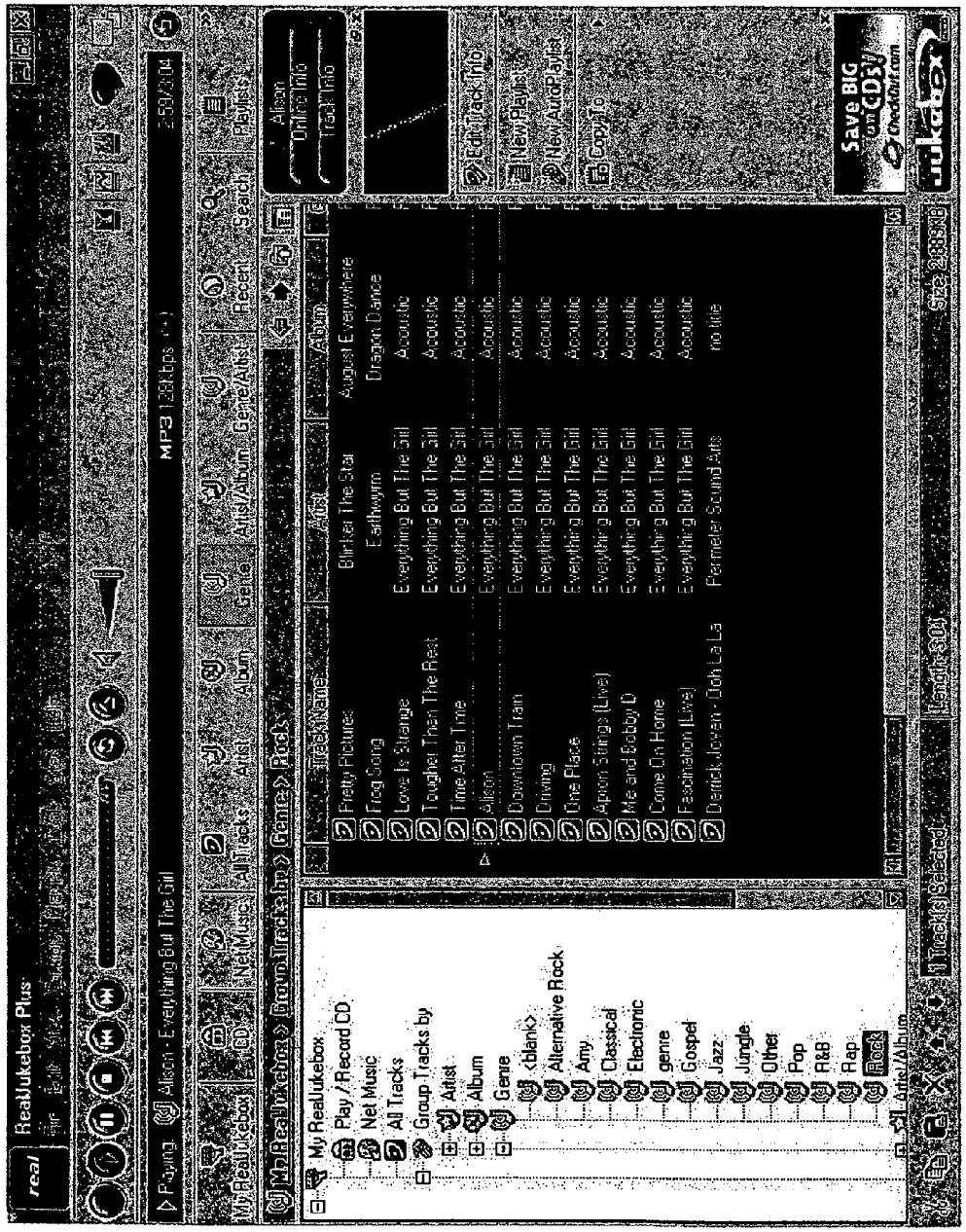
FIG. 1a illustrates an example display from one embodiment of the present invention.

A system and method which represent one embodiment and example application of the invention will now be described with reference to the drawings. Variations to the system and method which represent other embodiments will also be described. In one disclosed embodiment, the system and method are used to dynamically organize and present metadata to a user. It will be recognized that a variety of data structures may be used to help users organize and access the metadata.

For purposes of illustration, one embodiment will be described in the context of a metadata editor for organizing and accessing audio music metadata and audio music data within an audio music playing device such as, for example, RealJukebox®. While the inventors contemplate that the present invention is not limited by the type of content data and/or metadata to be managed and that the types of data may include other types of audio data as well as video, audio-visual, slideshow, image, and text, the figures and descriptions relate to an embodiment of the invention using audio music metadata and audio music content data. Furthermore, it is recognized that in other embodiments, the system and method for organizing and accessing metadata may be implemented as a single module and/or implemented in conjunction with a variety of other modules and the like. Moreover, the specific implementations described herein are set forth in order to illustrate, and not to limit, the invention. The scope of the invention is defined by the claims.

These and other features will now be described with reference to the drawings summarized above. The drawings and the associated descriptions are provided to illustrate embodiments of the invention, and not to limit the scope of the invention. Throughout the drawings, reference numbers may be re-used to indicate correspondence between referenced elements. In addition, the first digit of each reference number indicates the figure in which the element first appears.

I. OVERVIEW

In the metadata organization system, metadata is stored wherein the metadata provides information about content data. As used herein, metadata refers to data which is associated with or describes other data on the user system. The most common type of metadata is data which describes a content file. For example, if the user system were in the process of playing back a video file, the video file would be a content file. Basic metadata information related to this content file includes the simple fact that a media file is being played, the name of the content file, and the fact that the file is a video file, as opposed to audio or text or some other data type. Additional metadata information, or data which describes the content file, might include information such as what genre of video the file represents (a music video clip, a movie trailer, a television advertisement, etc.), what actors appear in the video, the director of the video, and the producing company of the video. In one embodiment, the metadata is stored with the content data, such as, for example embedded at the beginning, middle, or end of the content data file such that the content data module does not treat the metadata as content data. The metadata may be embedded in an "empty" field, for example, the metadata in an MP3 file may be stored before the audio data, but it is recognized that the location of the metadata may vary with the type of audio file and in some embodiments, the metadata or a portion of the metadata may be stored separate from the content data. In other embodiments, the metadata may be found in a local database and/or a remote database and could be found in a single file.

The metadata is organized by fields such that pieces of metadata are related to a corresponding field. For example, a sample set of metadata fields and corresponding metadata for the audio file Alison may include: Track Name=Alison; Album Name=Everything But the Girl; and Track Genre=Rock; wherein the metadata fields are: Track Name, Album Name, and Track Genre.

Information about the metadata fields is stored in a database and may include information, such as, for example, the field name, the data type, default value, display format data, and field options.

In the metadata organization system, the metadata fields may be grouped and organized into display sets for presentation to a user. For example, all of the metadata fields related to the Artist may be included in an Artist Information display set and may include fields such as, for example, Artist Name, Performer Photo, Conductor Photo, Accompanist, DJ, and Guitar. The metadata fields may also be included in category groupings such that fields related to a category grouping are presented to the user and unrelated fields are not presented to the user. For example, one category grouping may be "Classical" which includes basic fields such as, for example, Track Name, Track Genre, Artist Name, Album Name, as well as fields related to classical songs, such as, for example, Opus Number, Key, Movement, Era, and Arranged For. Another category grouping may be Pop/Rock which includes the basic fields as well as fields related to pop or rock songs such as, for example Preference, Situations, Tempo, Lyrics, Mood, and so forth. Other fields not related to pop or rock songs are not included, such as, for example, Opus Number, and Movement. Other types of category groupings may be created that allow the user access to metadata related to individual tracks as well as metadata related to a set of related tracks, such as, for example, artist information, and album information. Sample category groupings may include Album Information, Music Enthusiast, Jazz, Photos/Art, Track Contents, and All Fields.

Information about the metadata fields, the display sets, as well as the category groupings may be stored in a metadata organization database.

In the metadata organization system a metadata classification module dynamically reads metadata organization information, such as, for example, metadata field information, metadata display set information, and metadata category grouping information, from the metadata organization database. The system then reads metadata from a metadata database, and organizes the metadata for display in the proper display sets and fields in a graphical user interface. In the graphical user interface, a user may add, delete, and/or modify the metadata in the display. As the user changes the metadata, the metadata database is updated and the user's changes are reflected in the graphical user interface.

One benefit of this embodiment is that the metadata organization system can access metadata organization information from the metadata organization database, access metadata from the metadata database, and dynamically organize the metadata for display in the graphical user interface. This allows the metadata organization information and the metadata to be stored in a basic format and still presented to the user in an accessible form without requiring extensive or time consuming storage and/or processing of the metadata.

Another benefit of this embodiment is that the user is given access to the metadata to make additions, changes, and/or deletions through an easy to use graphical user interface wherein relevant metadata fields are accessed, grouped, and displayed in the graphical user interface. Using the graphical user interface, the user has access to the data through interface tools such as, for example, menus, windows, pointing devices, as well as drag and drop features. For example, a user may select from a drop down list of items to populate a field or a user may select a radio button to designate a value for a field.

An additional benefit of this embodiment is that the metadata information may be displayed in the graphical user interface using organizational techniques. Rather than having to traverse vast amounts of metadata to find a particular field, the user is instead presented with an organized view of the metadata. The user may select a category grouping that relates to the data he wishes to view and the data is displayed in organized display sets such that the user may find the data he wishes to view.

An additional benefit of this embodiment is that the user may create custom fields of metadata, custom display sets of metadata, as well as custom category groupings of metadata affording much flexibility and user control. For example, one user may want to add a field entitled "Rating" allowing the user to rate the audio file (e.g., on a scale from 1 to 10) and display the field in the "Basic Information" display set in the Classical Category grouping. The user may create and arrange metadata organization data using different tools. For example, a user may utilize a graphical user interface, for example, by dragging and dropping fields into display sets and category groupings or by manually creating a list of the fields in each display set and category grouping.

II. SAMPLE DISPLAY

FIG. 1a illustrates an example audio player program, the RealJukebox® program, that works with a metadata editor program. A sample display of a graphical user interface from a metadata editor program for organizing and editing metadata is shown in FIG. 1b. A scheme for managing metadata is disclosed in U.S. application Ser. No. 09/549,986, filed Apr. 14, 2000, entitled "SYSTEM AND METHOD FOR MANAGING METADATA" which is incorporated herein by reference.

In one example, a user may starts the RealJukebox® program in order to access his music files. Next, the user may select one of the nodes or tracks that appears in the tree window of the program using a device such as a mouse. In one example, the users selects the track entitled "Alison" and then clicks on the "Edit Track Info" button. The system then searches the metadata database for the metadata relating to the selected track as well as the metadata organization information that tells the system which fields to include in the display and how the metadata should be displayed, and then displays the metadata in the metadata editor program display. From the metadata editor display, the user may edit and/or view the metadata related to the selected track.

In FIG. 1a, a metadata track display 100 includes three windows, an available category grouping window 110, a command window 120, and a track information window 130 which includes sample metadata for the track "Alison."

The available category grouping window 110 lists the various category groupings that are available for selection by the user. The available category groupings define which fields are to be displayed in the track information window 130. For example, category grouping 1 may include fields 1, 2, 3, 4, and 5 whereas category grouping 2 may include fields 1, 2, 5, 6, 7, 8, 9, and 10. For more information on category groupings, see the section below entitled "Metadata Organization—Category Groupings."

The command window 120 provides the user with a variety of commands, such as, for example, to browse for a file containing a picture that can be inserted in field, such as an art field, to export the track information, to clear the property value, and to preview the track.

The track information window 130 displays the metadata for the selected track. In FIG. 1, the track "Alison" has been selected and the Pop/Rock category grouping has been selected. Thus, the fields that are part of the "Pop/Rock" category grouping are displayed in the track information window 130 and include the metadata for the track "Alison." Furthermore, the displayed fields and corresponding metadata are grouped into various display sets. The display sets for the Pop/Rock Category shown in FIG. 1 are Basic Information, Track Information, and Album Information. For more information on display sets, see the section below entitled "Metadata Organization—Display Sets."

The example program display also includes an "Apply Change to all Tracks in Album" field 140 which allows the user to designate that the changes should be propagated and/or applied to other metadata tracks that are in the same Album.

III. METADATA ORGANIZATION

In one embodiment, the metadata is organized into fields of information such that the fields may be grouped with other fields into display sets and included in category groupings.

A. Metadata Fields

In one embodiment, the metadata is organized by fields of information such that pieces of metadata are related to corresponding fields. The metadata field information may include the fields of metadata for a variety of metadata as well as the type of data stored in the field. For example, the "Album Name" metadata field may be of type "Short Text Field," the "Cover Art" metadata field may be of type "Photo," and the "Year" metadata field may be of type "Date." Table 1 illustrates a sample set of fields and their corresponding data types.

TABLE 1

| FIELD | DATA TYPE |
| --- | --- |
| Track Name | Short Text Field |
| Artist Name | Short Text Field |
| Track Genre | Short Text Field |
| Album Name | Short Text Field |
| Preference | Short Text Field |
| Situation | Short Text Field |
| Tempo | Short Text Field |
| Lyrics | Large Text Field |
| CD Track # | Number |
| Mood | Short Text Field |
| Year | Date |
| Comments | Large Text Field |
| Cover Art | Photo |

It is recognized that in other embodiments, the metadata field information may include a subset of the discussed data as well as other data, such as, for example, default value, field length, display format data, field values, and display set.

B. Display Sets

A display set designates how the fields are to be grouped in the track information window 130 of the display. For example, the Track Name field may be displayed in the "Basic Information" display set, the Preference field may be displayed in the "Track Information" display set, and the Cover Art may be displayed in the "Album" display set. Table 2 illustrates a sample set of display sets and their corresponding fields.

TABLE 2

| DISPLAY SET | FIELD |
| --- | --- |
| Basic | Track Name |
|  | Artist Name |
|  | Track Genre |
|  | Album Name |
| Track | Preference |
|  | Situation |
|  | Tempo |
|  | Lyrics |
|  | CD Track # |
|  | Mood |
|  | Year |
|  | Comments |
| Album | Cover Art |

It is recognized that in other embodiments, the display set information may be organized in a different manner. For example, the display set information may be organized by field and may include additional information such as, for example, order to be displayed, graphics used to display, and location of fields within the display set. In addition, the display set information may also be related to the category groupings.

C. Category Groupings

A category grouping defines which fields are included in the category. A category grouping may relate for example, to a genre, to the number of fields included, as well as to a variety of other categories. In one embodiment, a field may be included in one or more category groupings. For example, one category grouping may include fields that relate to many audio tracks as well as fields that relate to classical music while another category grouping may include basic fields as well as fields that relate to Jazz music. Furthermore, the category groupings may relate to a set of related tracks as well as to individual tracks. Table 3 illustrates a sample category grouping for Pop/Rock music and Classical music.

TABLE 3

| CATEGORY | FIELD |
| --- | --- |
| Pop/Rock | Track Name |
|  | Artist Name |
|  | Track Genre |
|  | Album Name |
|  | Preference |
|  | Situation |
|  | Tempo |
|  | Lyrics |
|  | CD Track # |
|  | Mood |
|  | Year |
|  | Comments |
|  | Cover Art |
| Classical | Track Name |
|  | Artist Name |
|  | Track Genre |
|  | Album Name |
|  | Opus Number |
|  | Type of Work |
|  | Era |
|  | Key |
|  | Movement |
|  | Arranged For |
|  | Conductor Photo |
|  | Principal Cellist |
|  | Country of Origin |
|  | Voice Soloist |
|  | Conductor Info |
|  | Composer |
|  | Orchestra |
|  | Conductor |
|  | Soloist |
|  | Principal Brass |
|  | Percussionist |
|  | Vocal |
|  | Orchestra Photo |
|  | Soloist Photo |
|  | Principal Violinist |
|  | Principal Woodwind |
|  | Composer Photo |
|  | Language |
|  | Content Type |
|  | Listener Review |
|  | Published Review |
|  | Canonic Work |
|  | Content Description |
|  | Cover Art |
|  | Back Cover Art |
|  | Key Persons |
|  | Early Form of School |
|  | Later Form of Historical Period |

TABLE 3-continued

| CATEGORY | FIELD |
|---|---|
| | Date Range |
| | Concurrent Events |
| | Classical Form |
| | City of Origin |
| | Era |
| | Duration of Silence |
| | Always Follow With |
| | Language |
| | Published Review |
| | Use Tempo as Movement |
| | Name |
| | Period Instrumentation |
| | Mode |
| | Form |
| | Tonality |
| | Time Signature |
| | Tuning System |
| | Score |
| | BPM |
| | Arranged For |
| | Recording Date |
| | Performance Photo |
| | Recording Session Photo |

It is recognized that in other embodiments, the category grouping information may be organized in a different manner. For example, in a different embodiment certain fields or all fields could be restricted to be included in at most one category grouping. In addition, the category grouping information may include additional information, such as, for example, display set, and a favorite field.

While exemplary the metadata organization data uses the field name as the unique identifier it is recognized that in other embodiments a different unique identifier may be used. For example, the unique identifier may be a randomly generated code, an automatically generated code, a user entered code, or a combination of fields.

In one embodiment, the metadata field information, the display sets, and/or the category groupings may be preselected by the program while in another embodiment all users or a subset of users may be allowed to edit, create, and/or delete the metadata field information, the display sets, and/or the category groupings. For example, in one embodiment, the end users may be restricted from changing the fields and/or adding new fields while the music track distributors may be allowed to add new fields and create custom display sets and/or category groupings.

III. METADATA ORGANIZATION SYSTEM

Figure 2:
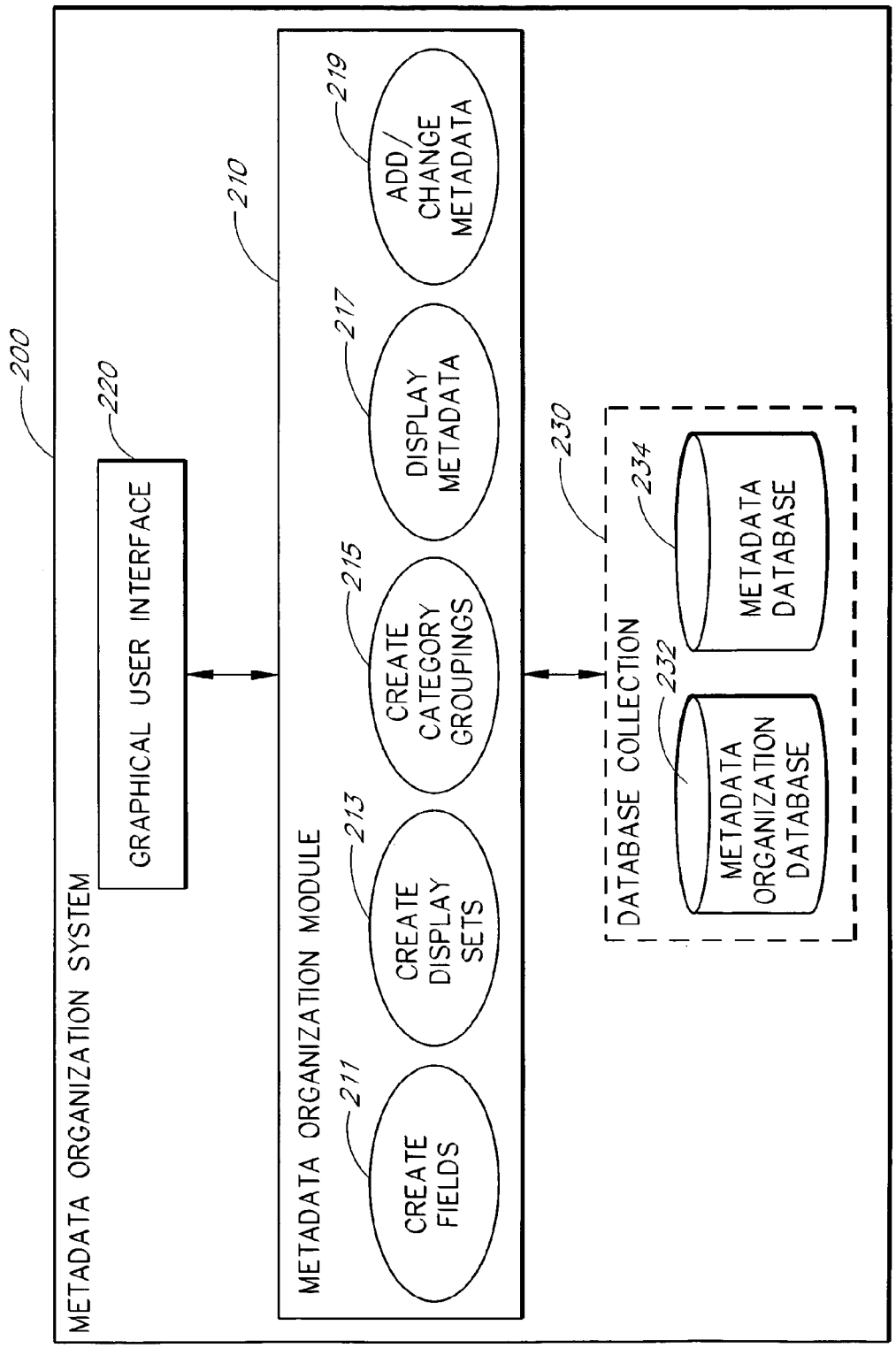
FIG. 2 illustrates a high-level block diagram of one embodiment of the present invention.

FIG. 2 represents an overview of one embodiment of a metadata organization system 200. In one embodiment, the metadata organization system 200 manages descriptive data, herein after referred to as metadata, about content data. For example, if the content data is a set of audio files, the corresponding metadata may include information about the audio files such as, for example, the album, artist or speaker, genre, and the unique identifying characteristic of a track. In another embodiment, the content data may be a set of video files, and the corresponding metadata may include information about the video files such as, for example, the genre, video length, leading actors, and parent advisory rating. It is recognized that in other embodiments, the metadata organization system 200 may manage other types of content data and/or metadata. The content data may include, for example, audio books, video, speeches, slide shows, hyper cards, multimedia files, resumes, radio broadcast, old time radio, address books, sensory data, virtual reality content, video games, and combat simulations. In addition, the related metadata may include, for example, the name of the advertisers, the featured artist of the content, stories about actors or speakers in the content, links to related content, and links to content by the same author or artists.

In FIG. 2, the metadata organization system 200 includes a metadata organization module 210 that communicates with a graphical user interface 220 and a database collection 230. The metadata organization module 210 includes a create fields process 211, a create display sets process 213, a create category groupings process 215, a display metadata process 217, and an add/change metadata process 219. Furthermore, the database collection 230 includes a metadata organization database 232 as well as a metadata database 234.

As used herein, the word module, whether in upper or lower case letters, refers to logic embodied in hardware or firmware, or to a collection of software instructions, advantageously having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

In one embodiment, the metadata organization system 200 is implemented on a user computer (not shown). The user computer is a device which allows a user to access the content data and/or the metadata. While the term user computer is used, it is recognized that in other embodiments, the metadata organization system 200 may be implemented on other systems such as, for example, a portable computing device, a portable audio player, a portable video player, a server, a computer workstation, a local area network of individual computers, an interactive television, an interactive kiosk, a personal digital assistant, an interactive wireless communications device, a handheld computer, a telephone, a router, a satellite, a smart card, an embedded computing device, or the like.

In one embodiment, the user computer is a conventional, general purpose computer using one or more microprocessors, such as, for example, a Pentium processor, a Pentium II processor, a Pentium Pro processor, an xx86 processor, an 8051 processor, a MIPS processor, a Power PC processor, or an Alpha processor. In one embodiment, the user computer runs an appropriate operating system, such as, for example, Microsoft® Windows® 3.X, Microsoft® Windows 98, Microsoft® Windows® NT, Microsoft® Windows® CE, Palm Pilot OS, Apple® MacOS®, Disk Operating System (DOS), UNIX, Linux®, or IBM® OS/2® operating systems.

In one embodiment, the metadata organization system 200 includes or is connected to a player module (not shown). For example, the metadata organization system 200 may include an audio player, and a video player such that a user may access the content data as well as the metadata using the graphical user interface 220. In other embodiments, the player module may be, for example, the RealJukebox® player, the S3 Esc Diamond Rio 300 player, the S3 Diamond Rio 500 player, the RCA Lyra player, the Philips Rush player, and the Creative Nomad player.

A. Metadata Organization Module

In one embodiment, the metadata organization system 200 includes a metadata organization module 210. As indicated above, the metadata organization module 210 communicates with the graphical user interface 220 and the database collection 230.

The metadata management module 210 works with the graphical user interface 220 to organize and display metadata in the track information window 130. The metadata organization module 210 may build the display in the track information window 130 upon the occurrence of several events such as, for example, upon user request, upon an automatic request when a track is selected, and upon an automatic request if certain metadata is missing. In other embodiments, the metadata organization module 210 may generate a portion of or the entire display off-line. For example, if the metadata organization module 210 includes a default track or node that is selected, then the metadata organization module 210 may retrieve the metadata and the metadata organization information for the default track or node and pre-process it for display.

In one embodiment, the metadata organization module 210 includes a create fields process 211, a create display sets process 213, a create category groupings process 215, a display metadata process 217, and an add/change metadata process 219. For more information on these processes, see the section below entitled, Metadata Organization Processes. The metadata organization module 210 may include other processes (not shown) such as, for example, a process for retrieving metadata from an internal source such as a local database, or an audio music file located on the hard drive, etc. as well as a process for retrieving metadata from an external source such as from a remote web site, a remote dial-in location, an FTP site, user input, a CD-ROM, a Zip drive, as well as other removable storage devices.

B. Graphical User Interface

In one embodiment, the metadata organization system 200 includes a graphical user interface 220 ("GUI"). The GUI 220 in FIG. 2 presents information to the user such as metadata for a specific track and/or metadata for a set of related tracks. The GUI 220 may also allow the user to view the data, change the view of the data, access data (e.g., for playback), modify data, delete data, and/or add data to the database collection 230. In addition, the GUI may allow the user to add, delete, and/or modify the metadata organization information. For example, the GUI may allow the user to create display sets by drawing a rectangle and dragging and dropping metadata fields into the rectangle to create a display set.

The GUI 220 may be implemented as a module that uses text, graphics, audio, video, and other media to present data and to allow interaction with the data. The GUI 220 may be implemented as a combination of an all points addressable display such as a cathode-ray tube (CRT), a liquid crystal display (LCD), a plasma display, or other types and/or combinations of displays; input devices such as, for examples, a mouse, trackball, touch screen, pen, keyboard, and voice recognition module; and software with the appropriate interfaces which allow a user to access data through the use of stylized screen elements such as, for example, menus, windows, dialog boxes, toolbars, and controls (e.g., radio buttons, check boxes, sliding scales, etc.).

C. Database Collection

In one embodiment, the database collection 230 includes a metadata organization database 232 as well as a metadata database 234.

1. Metadata Organization Database

The metadata organization database 232 includes data about the organization of the metadata. This data advantageously includes metadata field information, metadata display set information, and metadata category grouping information.

The metadata field information may include information about the fields of metadata such as, for example, the field ID, the field name, the field category, the default value, and/or display format data. For more information on metadata field information, please refer to the section above entitled "Metadata Organization—Metadata Fields."

The metadata display set information may include information about how the fields are to be grouped in the display such as, for example, which fields are in which display sets, the order of the fields in the display set, and the location of the fields in the display set. For example, the "Track Name" field may be displayed in the "Basic Information" display set, the "Preference" field may be displayed in the "Track Information" display set, and the "Cover Art" may be displayed in the "Album Information" display set. Furthermore, in one embodiment, the metadata display set information may correspond to more than the field name. In one embodiment, the metadata display information may correspond to the category grouping and the field name. For example, a display set may include five fields for one category grouping and three different fields for a different category grouping. For example, the display set "Basic" may include fields "Track Name," "Artist name," "Track Genre" and "Album Name" for the "Pop/Rock" category grouping and also include the fields "Conductor" and "Year" for the "Classical" category grouping. In other embodiments, the metadata display information may correspond to other factors. For more information on metadata field information, please refer to the section above entitled "Metadata Organization—Display Sets."

The metadata category grouping information may include information about the fields that are included in each category grouping. A category grouping may relate to one genre, to the number of fields included, to an individual track, a set of related tracks, as well as to a variety of other factors. For example, one category grouping may include all of the fields that relate to Classical music while another category grouping may include all of the existing metadata fields. In one embodiment, the category grouping information may include the name of the category grouping, such as, for example, "Classical," "Pop/Rock," or "Entire Property Set" and the fields that are part of the set. In another embodiment, the category grouping may also include the metadata display sets for each field in the category as well as other additional information. For more information on metadata field information, please refer to the section above entitled "Metadata Organization—Category Groupings."

It is recognized that the metadata organization database 232 may include other types of information as well, such as default settings, user preferences, user trends, and information pertaining to the program device so as to compensate for smaller or larger displays (e.g., a cellular phone display is typically smaller than the display for a personal computer).

In addition, in other embodiments, the metadata organization database 232 may be implemented as several separate databases.

2. Metadata Database

The metadata database 234 includes metadata about the content data. For example, the metadata database 234 may include metadata about audio music files, such as, for example, Track Name, Artist Name, Album Name, Track Genre, CD Track #, length, format, quality, comments, date and/or time last played, date and/or time the track was created, file size, file location, protection flag, as well as other types of information related to the audio music file. The metadata may include fields that are used in standards such as, for example, ID3v1, ID3v2, and ID3v2.3.0, as well as other fields that are created by other parties, by users, by distributors, and/or by content providers. For a detailed description on the ID3 standards, please refer to the web site, http://www.id3.org. As indicated above, it is also recognized that in other embodiments, the metadata database 234 may manage other types of content data and/or metadata. For example, the content data may include, for example, audio books, video, speeches, slide shows, hyper cards, multimedia files, resumes, radio broadcast, old time radio, address books, sensory data, virtual reality content, video games, and combat, simulations. In addition, the related metadata may include, for example, the name of the advertisers, the featured artist of the content, stories about actors or speakers in the content, links to related content, and links to content by the same author or artists. Table 4 illustrates a sample set of audio music metadata for a track entitled "Alison."

TABLE 4

| FIELD | DATA |
| --- | --- |
| Track Name | Alison |
| Artist Name | Everything But . . . |
| Track Genre | Rock |
| Album Name | Acoustic |
| Preference | Very Good |
| Situation | Dinner |
| Tempo | Moderate |
| Lyrics | <blank> |
| CD Track # | 04 |
| Mood | Mellow |
| Year | 2000 |
| Comments | <blank> |
| Cover Art | <blank> |

In one embodiment, the metadata database 234 includes the metadata as well as the content data. For example, the metadata database 234 may include the audio files as well as the metadata that corresponds to the audio files. In another embodiment, the content data may be stored in a different database and/or only a subset of the content data may be stored in the metadata database 234. It is also recognized that the metadata database 234 may be implemented as several separate databases.

3. Sample Data Relationships

Figure 3:
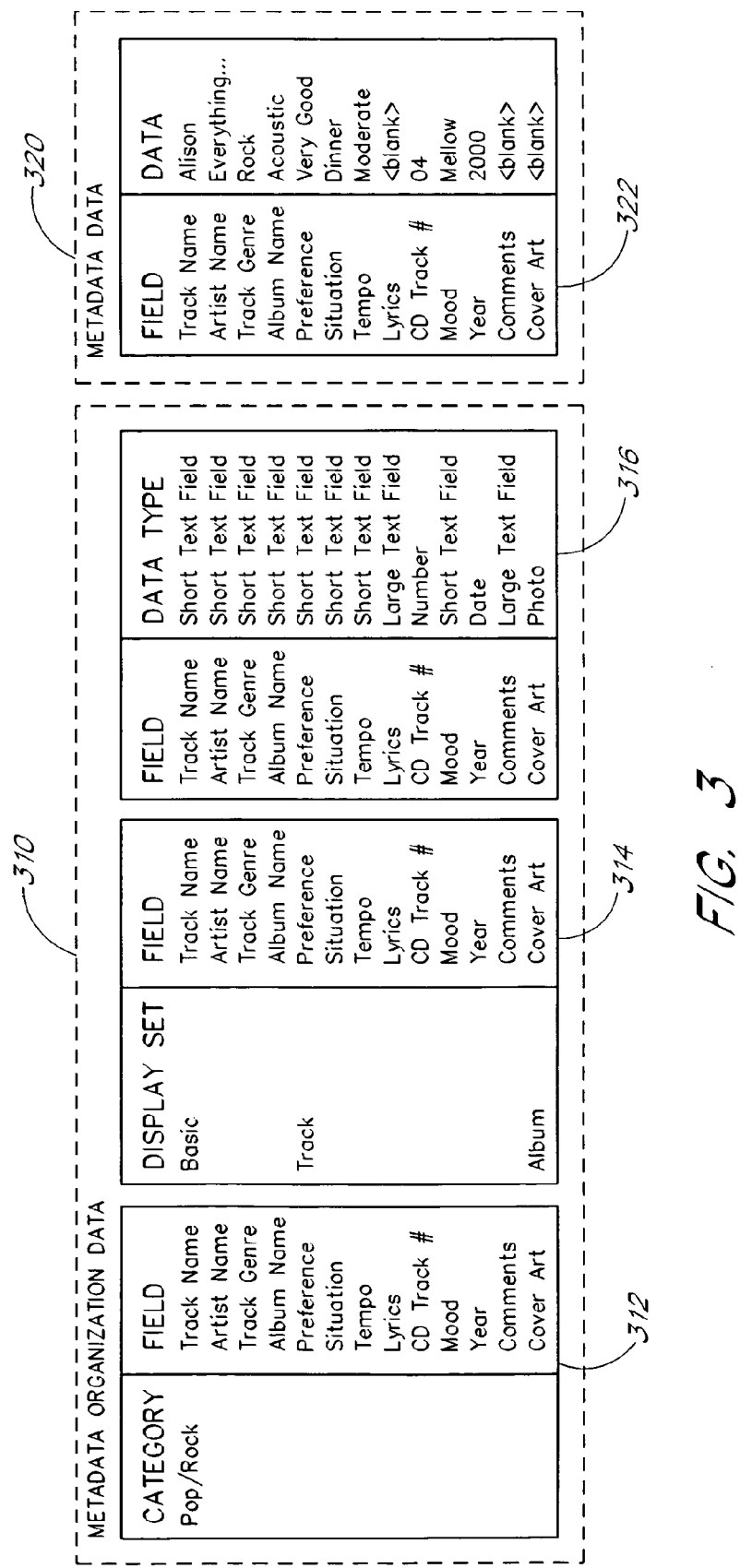
FIG. 3 illustrates an example set of metadata organization data and metadata data.

FIG. 3 illustrates a sample set of metadata organization data 310 and metadata data 320 wherein the data is related by the field name. In FIG. 3, the metadata organization data includes a category grouping table 312, a display set table 314, and a field table 316. In addition, the metadata data includes a metadata table 322 for the track entitled "Alison." It is recognized that in other embodiments additional information and/or different information could be stored in the tables. For example, the field table 316 may include additional fields such as, Conductor, Era, Key, Opus Number, etc., and the Preference and Situations fields could be removed. It is recognized that a large variety of field, display set, and category grouping combinations may be used. Furthermore, while the exemplary data is displayed in tables, it is recognized that the database may be implemented using other data structures as described below. Moreover, it is recognized that one or more of the tables could be combined to improve storage efficiency and access time. For example, the field table 316 may include an additional column entitled display set wherein the display set name is listed thus eliminating the need for the display set table 314. In one embodiment, the metadata organization data is stored in the metadata organization database 232 and the metadata data is stored in the metadata database 234. It is recognized that in other embodiment the data may be stored in a single database or in a different arrangement of databases.

4. Additional Embodiments

The database collection 230 may also include other databases (not shown) for performing various management tasks. For example, the database collection 230 may include a graphics database, a display view database, and/or a content data database.

In connection with the database collection 230, in one embodiment, there may be several processes (not shown) such as ID generators, number generators, statistics generators, session generators, and temporary storage units that work with the database collection 230.

In one embodiment, the database collection 230 is advantageously implemented using CodeBase, a semi-relational database offered by Sequiter. CodeBase is a high-speed xBase-compatible database engine that works with C/C++, Visual Basic, Delphi and Java under standalone and client/server environments. It is recognized that the database collection 230 may be implemented using a different type of relational database, such as Sybase, Oracle, and Microsoft® SQL Server as well as other types of databases such as, for example, a flat file database, an entity-relationship database, and object-oriented database, and/or a record-based database.

Moreover, while the database collection 230 depicted in FIG. 2 is comprised of several separate databases, it is recognized that in other embodiments, the database collection 230 may contain other databases or some of the databases may be omitted and/or combined. In addition, the database collection 230 may be implemented as a single database with separate tables or as other data structures that are well know in the art such as linked lists, and binary trees.

In one embodiment, the database collection 230 may be connected to a backend component (not shown) that receives database requests via servlets, small programs that run on servers, and sends a corresponding request to the database collection 230. It is recognized that in other embodiments data access may be performed differently, for example, a different type of backend component may be used, or the database collection 230 may be accessed directly.

IV. METADATA ORGANIZATION PROCESSES

In one embodiment, the metadata organization module 210 includes a create fields process 211, a create display sets process 213, a create category groupings process 215, a display metadata process 217, and an add/change metadata process 219.

A. Create Fields Process

The create fields process 211 is used to create new fields of metadata. In one embodiment, the users have access to this process so as to create new fields, however, it is recognized that in other embodiments, a single user or a set of users may be restricted from creating fields of metadata.

Figure 4:
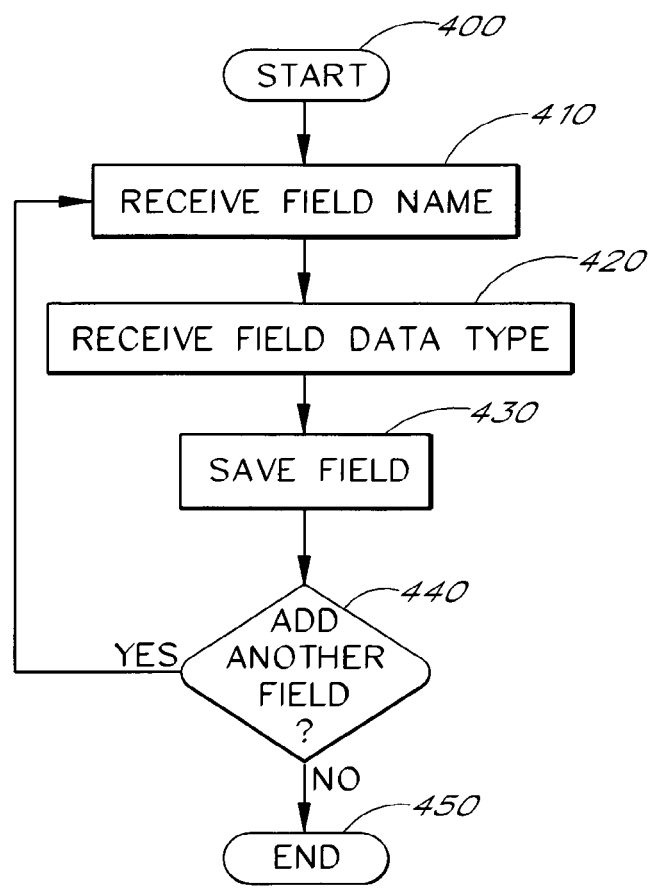
FIG. 4 illustrates a flowchart of one embodiment of creating fields.

One embodiment of a create fields process 211 is shown in FIG. 4. Beginning at a start state 400, the create fields process 211 proceeds to a state 410. In state 410, the create fields process 211 receives a field name and proceeds to a state 420. In state 420, the create fields process 211 receives the field's data type and proceeds to a state 430. In state 430, the create fields process 211 saves the information in the metadata organization database 232 and proceeds to a state 440. In state 440, the create fields process 211 queries to user to determine whether the user would like to add another field. If so, the create fields process 211 returns to state 410 otherwise, the create fields process 211 proceeds to an end state 450.

As discussed above, it is recognized that in other embodiments, the create fields process 211 may be implemented in a different manner. In one embodiment, the create fields process 211 may include steps to receive different and/or additional information. for example, the create fields process 211 may include a "receive display set name" state such that the display set of the field is also entered by the user and received. In addition, default values could be used such as, for example, a default field name, and/or a default data type such that the field name and/or data type is received from a process rather than the user. Furthermore, in other embodiments, the field information may be stored in temporary storage and later saved to the metadata organization database 232 rather than having the data saved after each field is created.

B. Create Display Sets Process

The create display set process is used to create display sets of metadata and to assign fields to the new display sets.

Figure 5:
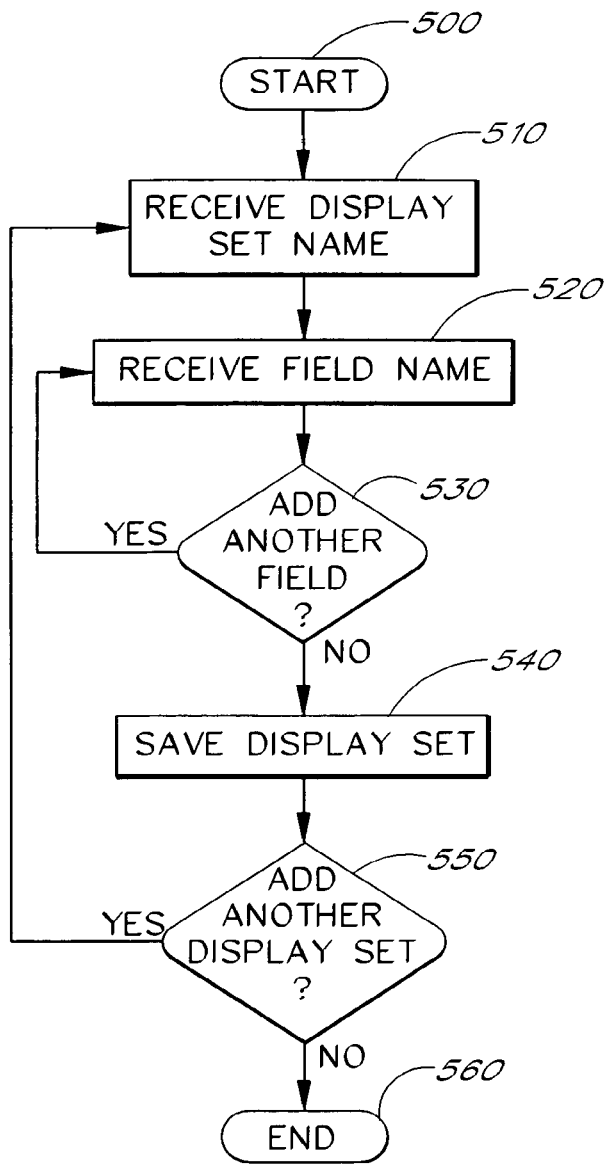
FIG. 5 illustrates a flowchart of one embodiment of creating display sets.

One embodiment of a create display sets process 213 is shown in FIG. 5.

Beginning with the start state 500, the create display sets process 213 proceeds to a state 510. In state 510, the create display sets process 213 receives a display set name and proceeds to a state 520. In state 520, the create display sets process 213 receives a field name to add to the display set and proceeds to state 530. In state 530, the create display sets process 213 determines whether or not the user wants to add another field. If yes, then the create display sets process 213 proceeds to state 520. If not, then the create display sets process 213 proceeds to a state 540. In state 540, the create display sets process 213 saves the display set in the metadata organization database 232 and proceeds to a state 550. In state 550, the create display sets process 213 determines whether or not the user wants to add another display set. If so, then the create display sets process 213 proceeds to state 510. If not, then the create display sets process 213 proceeds to an end state 560.

As discussed above, as recognized in other embodiments, the create display sets process 213 may be implemented in a different manner. In one embodiment, the create display sets process 213 may include steps to receive different and/or additional information. For example, the create display sets process 213 may allow the user to enter a field name as well as a category name. It is recognized, however, in other embodiments, the display set fields may be assigned in a different process. Furthermore, in other embodiments, the display sets may be stored in temporary storage and later saved to the metadata organization database 232, rather than having the data saved after each display set is created.

C. Create Category Groupings Process

The create category groupings process 215 is used to create category groupings and to assign fields to the category groupings.

Figure 6:
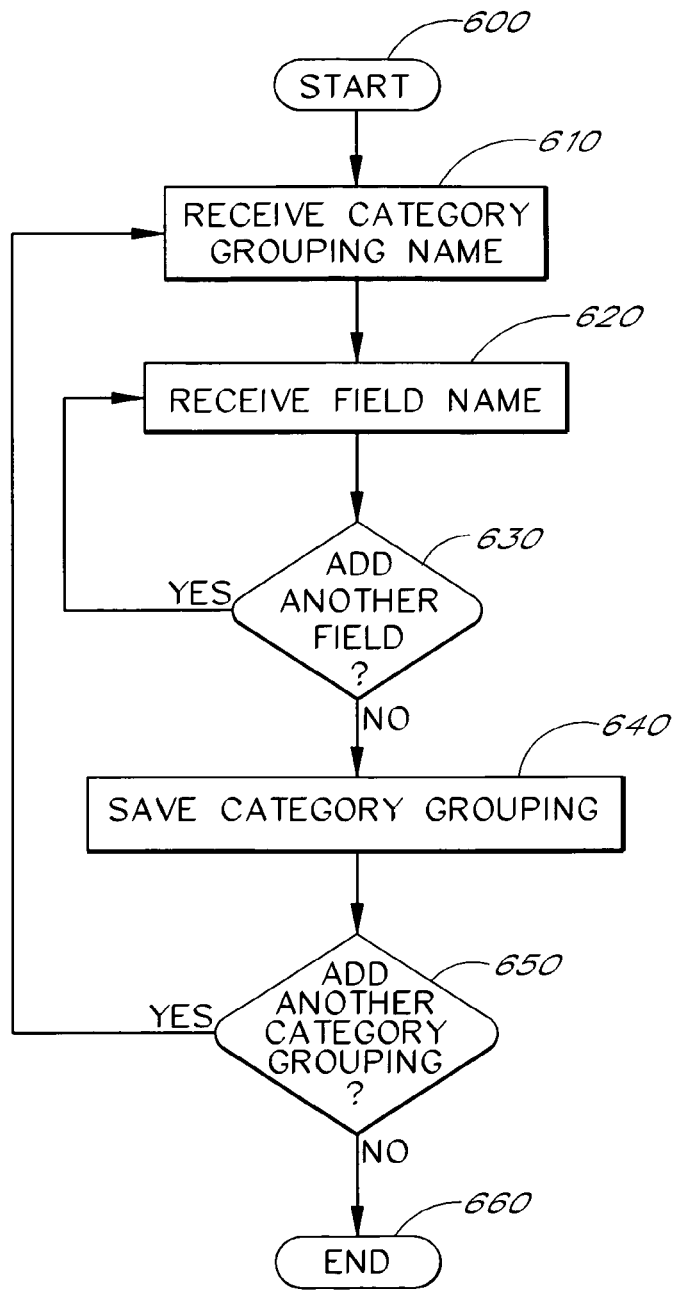
FIG. 6 illustrates a flowchart of one embodiment of creating category groupings.

One embodiment of a create category groupings process 215 is shown in FIG. 6. Beginning with the start state 600, the create category groupings process 215 proceeds to a state 610. In state 610, the create category groupings process 215 receives a category grouping name and proceeds to a state 620. In state 620, the create category groupings process 215 receives a field name to add to the category grouping and proceeds to state 630. In state 630, the create category groupings process 215 determines whether or not the user wants to add another field. If yes, then the create display groupings process proceeds to state 620. If not, then the create display groupings process proceeds to a state 640. In state 640, the create category grouping process saves the category grouping in the metadata organization database 232 and proceeds to a state 650. In state 650, the create category groupings process 215 determines whether or not the user wants to add another category grouping. If so, then the create display groupings process proceeds to state 610. If not, then the create display groupings process proceeds to an end state 660.

As discussed above, as recognized in other embodiments, the create category groupings process 215 may be implemented in a different manner. In one embodiment, the create category groupings process 215 may include steps to receive different and/or additional information. For example, the create category groupings process 215 may allow the user to enter a field name as well as a display set name. It is recognized, however, in other embodiments, the display set may be assigned in a different process. Furthermore, in other embodiments, the category groupings may be stored in temporary storage and later saved to the metadata organization database 232, rather than having the data saved after each category grouping is created.

D. Display Metadata Process

The display metadata process 217 is used to display the display metadata corresponding to the fields included in the selected category grouping wherein the metadata fields are organized into display sets.

Figure 7:
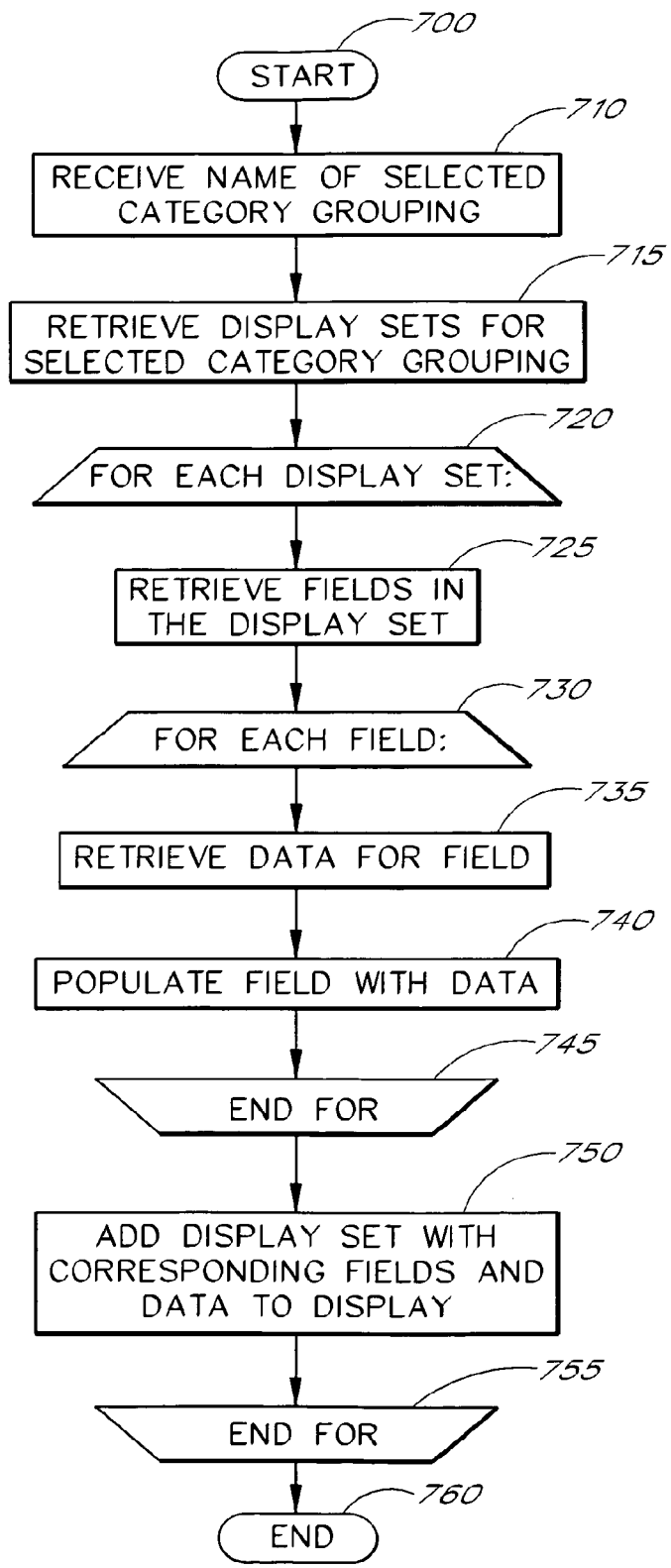
FIG. 7 illustrates a flowchart of one embodiment of dynamically displaying metadata.

One embodiment of a display metadata process 217 is shown in FIG. 7. Beginning with the start state 700, the display metadata process 217 proceeds to a state 710. In state 710, the display metadata process 217 receives the name of the selected category grouping and proceeds to a state 715. In state 715, the display metadata process 217 retrieves the display sets for the selected category grouping and proceeds to a state 720. In state 720, for each display set, the display metadata process 217 retrieves the fields in the display set in state 725 and proceeds to a state 730. In state 730, for each field, the display metadata process 217 proceeds to state 735 and retrieves the metadata for the field and proceeds to a state 740. In state 740, the display metadata process 217 populates the field with data and proceeds to a state 745 and repeats for each field in the display set. Once the fields in the display set have been traversed in state 745, the display metadata process 217 proceeds to a state 750. In state 750, the display metadata process 217 adds the display state with the corresponding fields and data to the display in the graphical user interface 220 and proceeds to the state 755. In state 755, the display metadata process 217 determines whether or not every display set has been traversed if so, then it proceeds to an end state 760; if not it returns to state 720 and retrieves the next display set and continues on.

It is recognized that the display metadata process 217 may be implemented in a different manner. For example, the display metadata process 217 may wait to display the metadata until all of the display sets and fields have been traversed, while in other embodiments, the display metadata process 217 may display the data and/or field as soon as the metadata and/or field is retrieved.

It is recognized that the display metadata process 217 may also traverse the metadata to pre-fill field values. For example, if the Album Name field is a drop-down list, then the display metadata process 217 may retrieve from the metadata database 234 a list of all unique album names, a list of all album names with two or more tracks, or a list of all album names of tracks that are marked as "popular," and populate the drop-down list with the list of album names.

E. Add/Change Metadata Process

The add/change metadata process 219 is used to update metadata in the metadata database 234.

Figure 8:
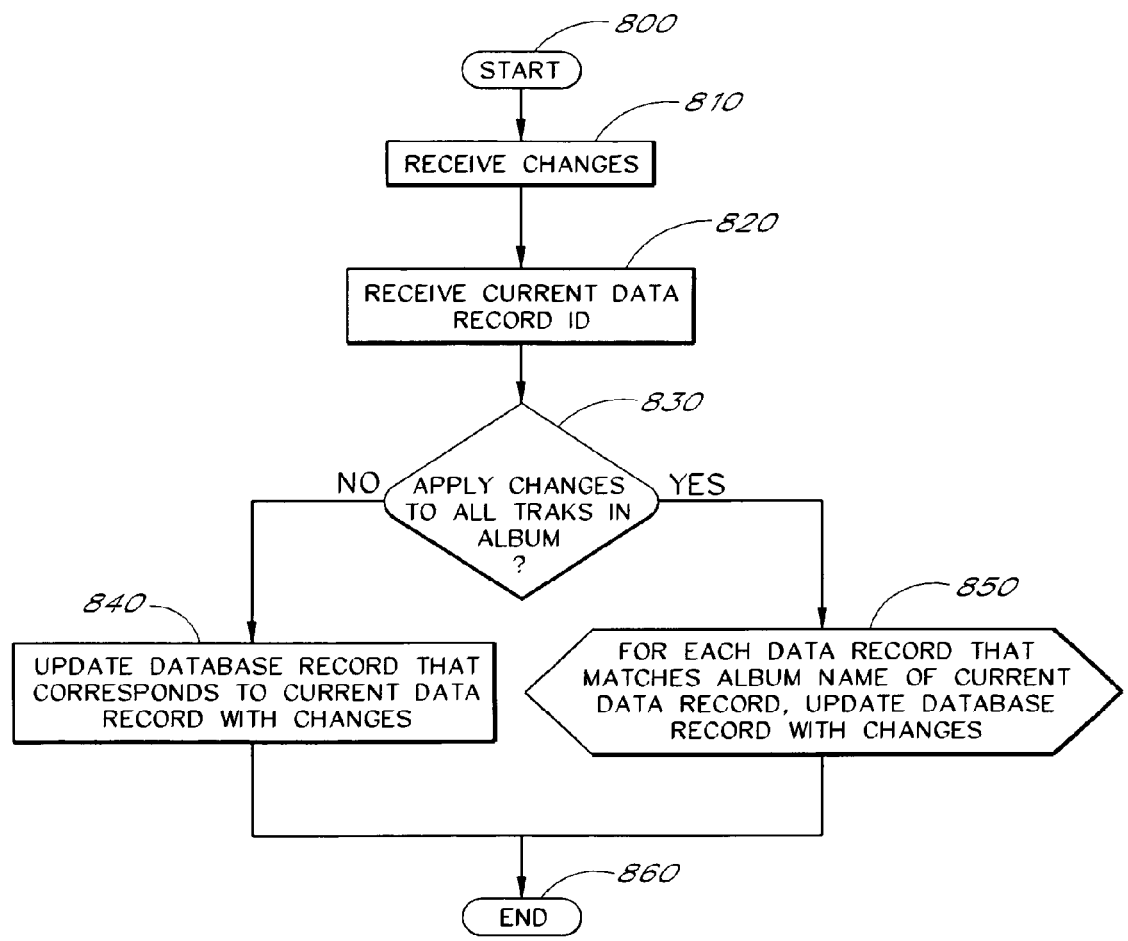
FIG. 8 illustrates a flowchart of one embodiment of adding/changing metadata.

One embodiment of an add/change metadata process 219 is displayed in FIG. 8. Beginning at a start state 800, the add/change metadata process 219 proceeds to a state 810. In state 810, the add/change metadata process 219 receives changes from a user to the metadata and proceeds to a state 820. In state 820, the add/change metadata process 219 receives the current data record ID wherein the current record ID identifies the data and/or individual record that is displayed in the graphical user interface 220. The add/change metadata process 219 then proceeds to a state 830. In state 830, the add/change metadata process 219 determines whether or not the user wants to apply changes to all tracks in the album. If not, then the add/change metadata process 219 proceeds to a state 840. In state 840, the add/change metadata process 219 updates the database record in the metadata database 234 that corresponds to the current data record with the user's changes and proceeds to an end state 860. If the user, however, elects to apply the changes to all tracks in the album, then the add/change metadata process 219 proceeds to a state 850. In state 850, the add/change metadata process 219 retrieves each data record in the metadata database 234 that matches the album name with the current data record and updates the retrieved data records with the changes from the user and proceeds to the end state 860.

Figure 9:
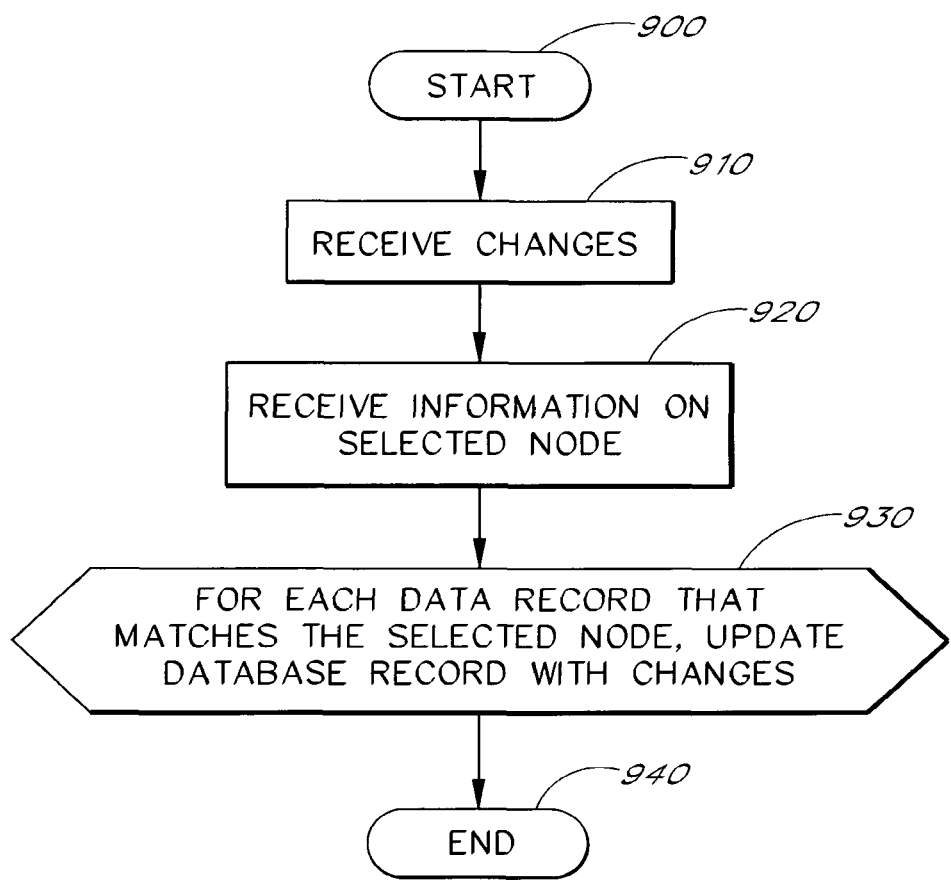
FIG. 9 illustrates a flowchart of another embodiment of adding/changing metadata.

An additional embodiment of an add/change metadata process 219 is displayed in FIG. 9 and may be used when the user elects to add, change, or delete metadata from a node or category rather than an individual audio track. Beginning at a start state 900, the add/change metadata process 219 proceeds to a state 910. In state 910, the add/change metadata process 219 receives changes from a user to the metadata and proceeds to a state 920. In state 920, the add/change metadata process 219 receives the selected node's information wherein the selected node's information identifies the selected node and/or the individual record(s) that fall within the node or share similar characteristics to the node. For example, the node may be an Album or a Genre such that when metadata for the node is altered, the changes are propagated to all tracks that are part of the Album or Genre. The add/change metadata process 219 then proceeds to a state 930. In state 930, the add/change metadata process 219 updates the database records in the metadata database 234 that relate to the selected node with the user's changes and proceeds to an end state 940.

It is recognized that in other embodiments, the add/change metadata process 219 may be implemented in a different manner. For example, the add/change metadata process 219 may store the changes in a temporary location and then later update the metadata database 234 with the changes.

V. OPERATIONS

It is contemplated that the invention may be used by a variety of users. For example, one set of users may include people who enjoy listening to music on the RealJukebox® player while another set of users may include record companies that wish to provide metadata to the purchasers of their music products. Other users may include content distributors as well as third party stores that sell music.

It is further contemplated that in one embodiment a fixed set of fields, display sets, and category groupings will be made available to a user. For example, a user may be sitting at the beach on the Fourth of July waiting for the fireworks and choose to download music from the Internet onto his Palm Pilot using the RealJukebox® program. The user may be given the option download the audio track alone or the audio track with the accompanying metadata and metadata organization data for an extra fee. After the audio file is finished downloading, the user may wish to view the metadata in order to find out the name of the record company. The system may display the metadata for the downloaded song and allow the user to enter any edits. For example, the user may change the mood of the song from "Sleepytime" to "Dance Music." The system may then update the metadata in the database to reflect the user's choices.

In one embodiment, the user may be given access to a variable set of fields, display sets, and category groupings allowing the user to make changes to the fields, display sets, and/or category groupings. For example, the user may want to create a field entitled "Top Ten College Songs" and add it to the Track Information display set so that he can track his favorite songs from his college years. In addition, the user may want to add a field entitled "College Photos" that will allow him to include photos from his time in college with his music files. The user may also want to create a new category grouping, entitled "Memory Lane" that includes his newly created fields "Top Ten College Songs'" and "College Photos" as well as the Basic Information fields. This flexibility allows the user to create new fields and new categories to his system. The system is not limited to a set of pre-selected fields contemplated by the system's designers as it is impossible for the designer's to predict the unlimited fields and organization structures that every potential user may wish to implement. Instead, users of the system may be allowed to create new fields, display sets, and categories that reflect their own individual styles and tastes.

In another example, a user may be given access to the metadata before gaining access to or perhaps without any access to the content data. For example, a user may be shopping in a local supermarket and hear a song over the intercom that the user would like to download. The user may utilize his cellular phone to use the system to look up the name of the artist and verify that the user does not already have the song in his content database. If the user is still interested, the user may download a copy of the song. If the user already has the song, the user may use the new metadata to update the existing metadata related to the song.

It is recognized that various embodiments of the invention may be used and that the examples provided above are meant only to illustrate various uses of the invention.

VI. CONCLUSION

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A computer implemented method for propagating metadata changes to metadata fields of multiple content files the method comprising:
   obtain, by a user device, a single user-selected content file, said single user-selected content file being associated with a plurality of metadata fields;
   receive, via an input device associated with said user device, a new metadata value for updating an indicated one of said plurality of metadata fields of said single user-selected content file;
   determine, by said user device, whether said indicated metadata field is of a type that is to be propagated to a group of content files related to said single user-selected content file; and
   when said indicated metadata field is of a type that is to be so propagated:
      determine, by said user device, the group of content files related to said single user-selected content file;
      determine, by said user device, whether to update said indicated metadata fields respectively associated with said group of content files; and
      when it is determined to make said update, update, by said user device, said indicated metadata fields of said single user-selected content file and said group of content files with said new metadata value.

2. The method of claim 1, wherein determine whether to update said indicated metadata fields respectively associated with said group of content files comprises:
   receive, by the user device, a confirmation to make said update to said metadata fields of said group content files with said new metadata value.

3. The method of claim 1, wherein said single user-selected content file and said group of content files are audio files.

4. The method of claim 3, wherein said metadata fields comprise a track name field, a genre field, an artist name field, and an album name field.

5. The method of claim 4, wherein obtain said user-selected content file further comprises:
   receive, from said user device, a selection of at least one of said genre field, said artist name field, and said album name field;
   in response to receive said selected at least one of said genre field, said artist name field, and said album name field, display, by said user device, a column having a plurality of rows for said track name fields corresponding to a plurality of content files; and
   receive, from said user device, a selection of one of said plurality of content files, wherein said selected one of said plurality of content files is said single user-selected content file.

6. The method of claim 5, wherein the method further comprises receive, from said user device, a selection of one of said displayed track names, and in response to receive said selected displayed track name, render content of the content file corresponding to said selected displayed track name.

7. A non-transient computer-readable medium containing computer-executable instructions that, when executed, configure a processor to perform a method comprising:
   obtain, by a user device, a single user-selected content file, said single user-selected content file being associated with a plurality of metadata fields;
   receive, via an input device associated with said user device, a new metadata value for updating an indicated one of said plurality of metadata fields of said single user-selected content file;
   determine, by said user device, whether said indicated metadata field is of a type that is to be propagated to a group of content files related to said single user-selected content file; and
   when said indicated metadata field is of a type that is to be so propagated:
      determine, by said user device, the group of content files related to said single user-selected content file;
      determine, by said user device, whether to update said indicated metadata fields respectively associated with said group of content files; and
      when it is determined to make said update, update, by said user device, said indicated metadata fields of said single user-selected content file and said group of content files with said new metadata value.

8. An apparatus having a processor and a memory containing computer-executable instructions that, when executed by the processor, perform a method comprising:
   obtain, by a user device, a single user-selected content file, said single user-selected content file being associated with a plurality of metadata fields;
   receive, via an input device associated with said user device, a new metadata value for updating an indicated one of said plurality of metadata fields of said single user-selected content file;
   determine, by said user device, whether said indicated metadata field is of a type that is to be propagated to a group of content files related to said single user-selected content file; and
   when said indicated metadata field is of a type that is to be so propagated:
      determine, by said user device, the group of content files related to said single user-selected content file;
      determine, by said user device, whether to update said indicated metadata fields respectively associated with said group of content files;
      and when it is determined to make said update, update, by said user device, said indicated metadata fields of said single user-selected content file and said group of content files with said new metadata value.

* * * * *

UNITED STATES PATENT AND TRADEMARK OFFICE
CERTIFICATE OF CORRECTION

PATENT NO. : 9,740,774 B2
APPLICATION NO. : 13/092094
DATED : August 22, 2017
INVENTOR(S) : Jeremy P. Chaney et al.

It is certified that error appears in the above-identified patent and that said Letters Patent is hereby corrected as shown below:

In the Claims

Column 19
Line 16, "...files the..." should read - ...files, the...

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*